United States Patent
Gamby et al.

(10) Patent No.: US 9,234,166 B2
(45) Date of Patent: Jan. 12, 2016

(54) MANUFACTURING PROCESS FOR A VEGETAL MATTER-BASED ANTI-LIME SCALE PRODUCT

(71) Applicants: Centre National de la Recherche Scientifique, Paris (FR); Universite Abderrahmane Mira, Bejaia (DZ); Odyssee Environement, Requeil (FR)

(72) Inventors: Jean Olivier Gamby, Paris (FR); Zineb Belarbi, Bejaia (DZ); Lila Chaal, Bejaia (DZ); Fabrice Guenole Chaussec, Guecelard (FR); Laid Makhloufi, Bejaia (DZ); Boualem Saidani, Bejaia (DZ); Bernard Tribollet, Malakoff (FR); Bruno Sotta, Fontenay-sous-bois (FR)

(73) Assignees: CENTRE NATIONAL DE LA RECHERCHE SCIENTIFIQUE, Paris (FR); UNIVERSITE ABDERRAHMANE MIRA, Bejaia (DZ); ODYSSEE ENVIRONNEMENT, Requeil (FR)

(*) Notice: Subject to any disclaimer, the term of this patent is extended or adjusted under 35 U.S.C. 154(b) by 0 days.

(21) Appl. No.: 14/383,016

(22) PCT Filed: Mar. 7, 2013

(86) PCT No.: PCT/FR2013/050484
§ 371 (c)(1),
(2) Date: Sep. 4, 2014

(87) PCT Pub. No.: WO2013/132193
PCT Pub. Date: Sep. 12, 2013

(65) Prior Publication Data
US 2015/0080281 A1 Mar. 19, 2015

(30) Foreign Application Priority Data
Mar. 7, 2012 (FR) .................................. 12 52062

(51) Int. Cl.
C09D 5/08 (2006.01)
C11D 3/382 (2006.01)
C11D 7/44 (2006.01)
C23F 14/02 (2006.01)
C11D 7/26 (2006.01)
C11D 11/00 (2006.01)
C02F 5/10 (2006.01)

(52) U.S. Cl.
CPC ... *C11D 7/44* (2013.01); *C02F 5/10* (2013.01); *C11D 7/267* (2013.01); *C11D 7/268* (2013.01); *C11D 11/0041* (2013.01); *C23F 14/02* (2013.01)

(58) Field of Classification Search
CPC ........ C09D 5/08; C09D 5/086; C11D 3/0073; C11D 3/382; C11D 3/3907; C11D 3/3912; C11D 7/44; C11D 11/0041; C11D 11/0064; C11D 11/007
See application file for complete search history.

(56) References Cited

U.S. PATENT DOCUMENTS

2008/0295728 A1* 12/2008 von Fraunhofer ..... C09D 5/086
106/14.42

FOREIGN PATENT DOCUMENTS

EP 1067214 A1 1/2001

OTHER PUBLICATIONS

Bouanani S et al., "Pharmacological and toxicological effects of Paronychia argentea in experimental calcium oxalate nephrolithiasis in rats", Journal of Ethnopharmacology, Elsevier Ireland Ltd, IE, May 4, 2010, vol. 129, Nr:1, pp. 38-45.
Suharso et al., "Gambier extracts as an inhibitor of calcium carbonate (CaCO3) scale formation", Desalination, Elsevier, Amsterdam, NL, Jan. 15, 2011, vol. 265, Nr:1-3, pp. 102-106.
Abdel-Gaber A M et al., "Investigation of fig leaf extract as a novel environmentally friendly antiscalent for CaCO3 calcareous deposits", Desalination, Elsevier, Amsterdam, NL, Sep. 30, 2008, vol. 230, Nr:1-3, pp. 314-328.
Abdel-Gaber A M et al., "A natural extract as scale and corrosion inhibitor for steel surface in brine solution", Desalination, Elsevier, Amsterdam, NL, May 19, 2011, vol. 278, Nr:1, pp. 337-342.

\* cited by examiner

*Primary Examiner* — Charles Boyer
(74) *Attorney, Agent, or Firm* — Jacobson Holman, PLLC.

(57) ABSTRACT

This invention concerns the process for the manufacture of an "anti-lime scaling" product, that is, a product designed to inhibit the formation of lime scale in elements such as pipes or hoses that could be subject to deterioration over time due to lime scale deposits. Specifically, the process of the invention is for an ecological anti-lime scale product. For this, the process according to the invention comprises a preparation step (1) of vegetal matter from the Caryophyllacae family, an infusion step (6) of this vegetal matter, a filtration step (7) of this infusion and a preparation step (9) of the anti-lime scale solution from a filtrate obtained during the filtration step.

12 Claims, 2 Drawing Sheets

MANUFACTURING PROCESS FOR A VEGETAL MATTER-BASED ANTI-LIME SCALE PRODUCT

This invention concerns the manufacturing process of an "anti-lime scale" product, that is, a product designed to slow the appearance of lime scale.

In particular, this invention concerns the manufacturing process of a plant-based anti-lime scale product designed to slow the appearance of lime scale in water flow conduits.

Water is currently used in numerous devices and installations, on both domestic and industrial levels. These devices and facilities contain a number of elements that are in contact with water during use.

Such elements include for example, pipes, supply and drainage hoses, fittings and other elements within the context of washing machines and dish washers for domestic use and closed and semi-open industrial cooling systems.

However, this contact with water is often harmful in the long-term, as these elements are subject to lime scale deposits over time.

These deposits, hereafter and more commonly called lime scale, are essentially made up of alkaline earth metal salts (calcium and magnesium) and their formation is linked to a number of factors. Among these salts, calcium carbonate is the most disruptive in numerous current building facilities such as facilities for the production of cold and/or hot water, local or departmental facilities for water distribution, water cooling systems for air cooling towers, etc.

This lime scale has a number of harmful effects on the facilities. These harmful effects include the considerable added costs generated by the need for regular cleaning as well as the progressive deterioration it causes.

Moreover, the accumulation of lime scale constitutes an obstacle for the water circulating where this accumulation takes place, thus progressively reducing the area through which water or any other liquid must flow through the point of this accumulation. This accumulation can at times to even completely obstruct the flow area, which can lead to a malfunction and deterioration of the facility.

To fight against this phenomenon, there are a number of methods aimed at eliminating these deposits and cleaning the facilities. These known methods are based on processes such as physical regimens, magnetic regimens and inhibitor-based chemical regimens.

These regimens present a number of disadvantages; in particular the physical and magnetic regimens are not always easy to implement and so do not always ensure efficient cleaning.

More generally, inhibitor-based chemical regimens are used by being directly integrated into the water circulating in the facilities, so as to prevent the source of the deposit.

These chemical regimens are, however, by definition not very eco-friendly and represent an environmental risk (refer to the REACH protocol established by the European commission on the authorisation and commercialisation of chemical substances that came into effect on Jan. 6, 2007). In addition, it is not very advantageous to eliminate one deposit in the facility by generating another deposit, associating the residues of this deposit in the facility and the residues of the chemical regimen used, at the facility output.

There are anti-lime scale regimens based on plant extracts such as, for example, the regimens described in the scientific publications of S. Suharso et al 2011, A. M. Abdel Gaber et al 2008 and A. M. Abdel Gaber et al 2011. Their efficiency however reaches a maximum of 85%.

The aim of this invention is therefore to provide a treatment procedure to fight lime scale that is ecological, integrates an ecological inhibitor, or "green inhibitor" that respects the environment while delaying, preventing or eliminating the presence of these lime scale deposits.

The purpose of this invention is to provide a manufacturing process for an anti-lime scale product, including at least the following steps:
- a preparation step of vegetal matter including saponosides, flavonoids, monosaccharides and holosides,
- an infusion step of this vegetal matter,
- a filtration step for this infusion
- a preparation step of an anti-lime scale solution using a filtrate obtained during the filtration step
- characterised in that the infusion step is performed using water brought to the boil and that the vegetal matter comes from at least one of the following families: Caryophyllaceae, Asteraceae. Illecebraceae or Urticaceae.

The preparation step of the vegetal matter is used to obtain this vegetal matter in the form the most adapted to its subsequent treatment. In this case, this step includes a plurality of sub-steps to obtain the vegetal matter in the form of ground vegetal matter that is conserved for subsequent use.

According to an advantageous method of the manufacturing process according to the invention, the vegetal material is obtained using pellitory type plants belonging to one of the following families: Caryophyllaceae such as the Paronychia argentae Lam, Asteraceae such as viscous inula, Illecebraceae, Urticaceae or Anacardiaceae.

According to one characteristic, the vegetal matter contains catechols.

The vegetal material harvested from these plant families is milled in a first preparation step. To facilitate harvesting, and depending on the plant selected, the vegetal matter is subdivided into three parts: flowering tops, flowers and leaves. Each of the parts of the vegetal matter thus ground (independently or jointly) is then infused according to chosen proportions and durations, then filtered to retain a solution comprised of anti-lime scale components without the infusion residues.

Aqueous extracts thus obtained, from each of the plant parts as appropriate, comprise the active ingredients of the vegetal matter that make up the inhibiting agent of the treatment. Each aqueous extract is itself added to the solutions or water likely to generate lime scale deposits to inhibit the lime scaling effect. For example, the lime scaling solution used in the networks can be supplemented with the aqueous extract according to proportions of 1 mL of aqueous extract for 99 mL of lime scaling solution.

The anti-lime scale product obtained by the process of the invention using natural vegetal matter is not harmful to the environment. In addition, this product efficiently inhibits the formation of lime scale as shown in the test results detailed below.

To optimise the results obtained by the filtrate and isolate from it the active to ingredients that act as inhibitor agents, the process according to the invention includes an initial polar fractioning step performed using the filtrate obtained during the filtration step, more particularly from the aqueous extract (using flower infusions or flowering tops or leaves) obtained during the filtration step. This initial fractioning is preferably performed on a C18 reverse silica column, a column filled with reverse silica or a SEP PAK C18 fractioning commercial mini-column.

The initial fractioning has the advantage of excluding all the components retained in the C18 column and corresponding to the lesser polar compounds. This initial fractioning can be considered as a "preparative" chromatography phase because the biomolecules that remain fastened to the C18 column are for a goodly portion species that have no lime scale inhibiting effect and are indeed harmful to this inhibition.

The fraction called F, corresponding to the filtrate not retained by the column C18, is retained and comprises a first filtrate presenting the desired inhibitor effects.

Fraction F includes filtrate polar compounds obtained during the filtration step. This fraction F is used to inhibit lime scaling in identical experimental conditions, with respect to the raw infusion or the aqueous extract only. In such experiments, by limescaling time we mean the time necessary for a total coating of an electrode in a lime scaling solution with calcium carbonate.

From among the most polar compounds of fraction F, that is, the solution not retained by the column C18, not all participate in inhibition of lime scale and can even lessen the action of the compounds playing a role in the general inhibition mechanism.

To avoid this, the procedure includes a secondary fractioning step using a polar fraction obtained during the initial fractioning step. The separation of compounds performed in the secondary fractioning step takes place according to the polarity gradient.

Secondary fractioning is performed on a carbon column. This second fractioning on a carbon column refines the purification of the filtrate by obtaining a solution comprising mainly only the elements with an inhibiting effect on lime scaling. When fraction F from column C18 is introduced in the carbon column, the elements with the highest polarity of fraction F are retained by this carbon column. Typically, the introduction in the carbon column of fraction F, itself obtained via introduction of the raw extract in column C18, is used for selecting elements from the raw extract with an intermediate polarity, as the other elements are separated from the solution and thus cannot disturb the inhibiting capacities of lime scaling of the solution according to the invention. This secondary fractioning step can take place on a column filled with active carbon or carbon-based commercial mini-columns.

This secondary fractioning is followed by a selection step of intermediate polarity elements resulting from the secondary fractioning step, that is, a selection of filtrates not retained by this column. During this selection step, two fractions are preferably retained, a first fraction is called fraction C0 and corresponds to the filtrate not retained on the carbon column after insertion of the fraction F in it, and a second fraction subsequently called fraction C100 is collected after introduction of an eluate comprised 100% of isopropanol in the carbon column after harvesting fraction C0.

Fractions C0 and C100 obtained following this selection step lead to optimal results, where inhibition of lime scaling with a process originating from such solutions is more efficient than that with treatment based on simple filtering of vegetal matter.

For further improvement, leading to the exclusion of further compounds present in fractions C0 and C100 that are not advantageous to the final formula of the inhibitor(s), the procedure comprises a decanting step of the fractions obtained by the secondary fractioning and a supernatant selection step obtained during this decanting. A decanting step reusing fraction C100 or fraction C0 is used to isolate the compounds or the active principles of the solution.

A selection is performed on the decanting obtained and only the supernatant is retained according to the invention. This supernatant comprises the methanolic phase of this decanting. The supernatant obtained after lyophilisations (from the decanting in 1 mL of methanol in C0 then in C100) is used to considerably improve inhibition of lime scale. Preferably, the molecular formula of the major compound is $C_7H_{13}N_2O_2$ This formula advantageously comprises minor compounds of the molecular formulae $C_9H_{17}O_2$ and $C_8H_{13}O_3$ (absorbency of around 30 and 18% respectively) and very minor compounds of raw formulas $C_{10}H_{21}O$ and $C_{10}H_9N_2$ (absorbency of less than 5%).

In one execution variant, the invention foresees purification of the fraction C100 on an ion exchange column. This purification also improves the selection of only the inhibitor elements according to the invention. This purification of fraction C100 is for example performed on a mixed ion exchanging resin (Mix Bed Resin AG 501-X8, Bio Rad). This resin is comprised of a mixture of the anion exchange phase of type AG 1-X8 and the cation exchange phase type AG 50-X8. The solvents used are, preferably, ethanolamine and triethanolamine.

One variant of the separation process via ion exchange uses one column filled with Sephadex gel (Sephadex LH 20) balanced in the methanol. In this variant, the elute is preferably a mixture of water (10%) and methanol (90%) after fractioning of C0 and C100, for a water (20%)-methanol (80%) eluate.

Preferably, fraction C100 is purified on an ion exchange column AG501 X8 using as ethanolamine 1M with pH 11.6 as eluate. This purification obtains a solution with a considerable inhibiting effect.

Advantageously, the solvent used during this purification is comprised of amines. Thus, the solvents the most suited to eluate the active molecule are ethanolamine or triethanolamine.

This presence of these amines considerably improves lime scale inhibition. In addition, these amines obtain a solution able to fight both lime scale and corrosion in domestic and/or industrial facilities.

In a variant of the process according to the invention a purification step of fraction F, via at least one chromatography preferably of type HPLC (chromatography in liquid phase at high pressure), is included between the filtration step and the preparation step of the anti-lime scale solution. This variant of the procedure refines the purification of fraction F by optimising the concentration of the "green" inhibitor compound in the anti-lime scale solution.

This invention also aims to achieve an anti-lime scale product obtained by the process according to the invention and in particular on an anti-lime scale product obtained by the process according to the invention and comprising different families of biomolecules such as saponosides, monosaccharides and holosides, flavonoids and if appropriate catechols. The main component of the product according to the invention preferably has a mass/charge ratio m/z=157.1 and a molecular formula $C_7H_{13}N_2O_2$, However, there are minor compounds of molecular formulae: $C_9H_{17}O_2$. $C_8H_{13}O_3$, $C_{10}H_{21}O$ and $C_{10}H_9N_2$.

The invention also centers on the use of the product according to the invention by the addition of the product to the water flowing in a device or facility, and if appropriate associated with an anti-corrosion film former such as ethanolamine or triethanolamine.

This invention will now be described with the help of uniquely illustrative examples that in no way limit the scope of the invention, and using the attached illustrations, in which:

FIG. 1 represents an organisational flowchart of the process steps according to the invention;

Figure 1:
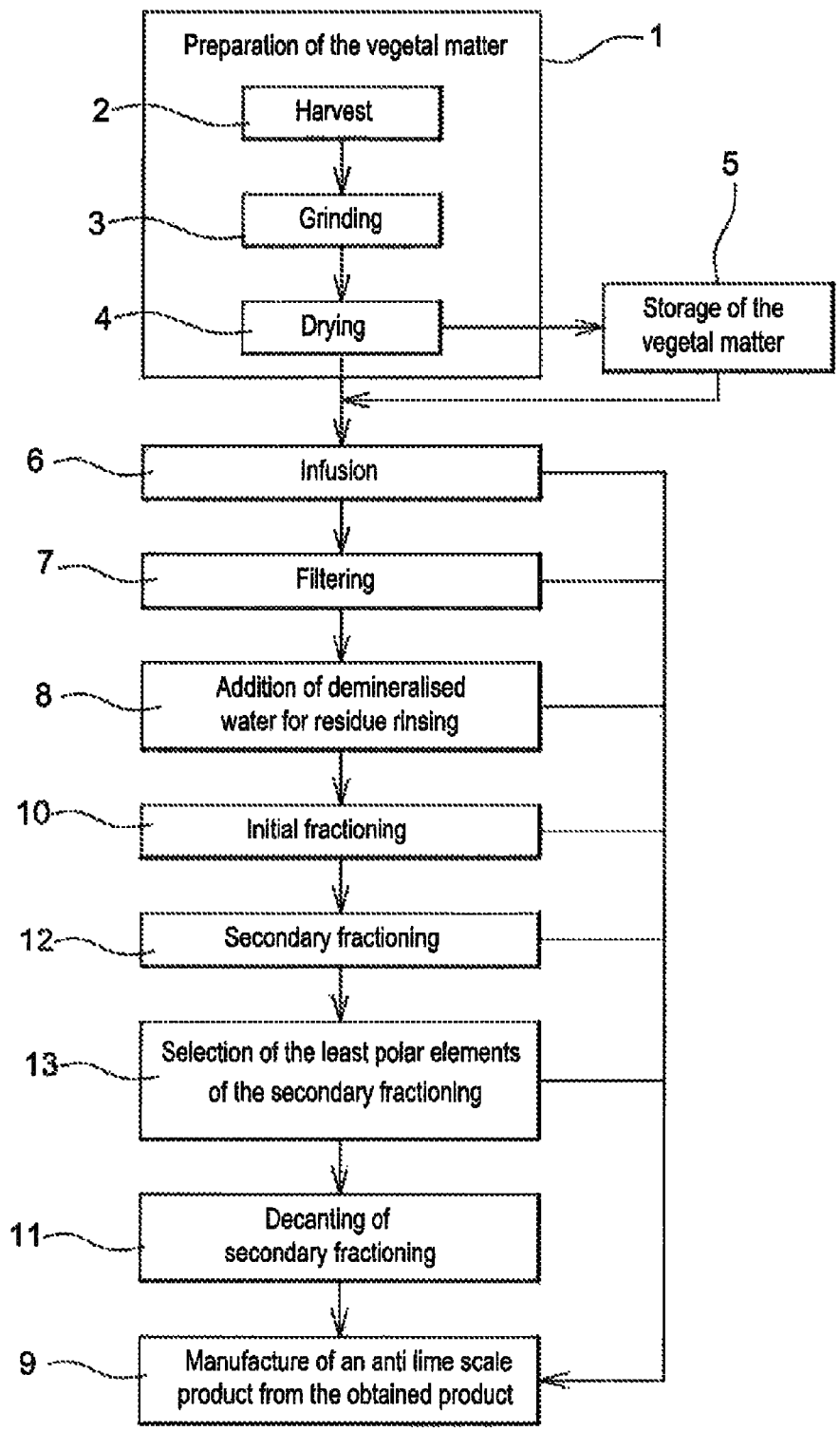
FIG. 1 represents an organisational flowchart of the steps in the process according to the invention.

The process according to the invention, which is used to produce an ecological anti-lime scale product, is comprised of a preparation step 1 of the vegetal matter at the base of the product. The first phase in this preparation step 1 consists of a harvesting step 2 of vegetal matter.

Harvesting the vegetal matter takes place on the aboveground parts of the plants, that is, the flowertops, leaves and/or flowers of the plant. The harvest is preferably performed on plants from the Caryophyllaceae, Illecebracea, Asteraceae or Urticaceae family.

Once the vegetal matter is harvested, it is ground 3 using an electric grinder other any other procedure known to a skilled person used to obtain a ground vegetal matter with a size in the order of 1 or 2 mm.

In order to be conserved in an optimal fashion for subsequent use, the ground vegetal matter is dried 4 at ambient temperature away from light in a well-aired and/or ventilated area. This drying process is used on the one hand to prevent photo-oxidation, and on the other hand, the formation of mildew.

To ensure correct preservation, the vegetal matter thus obtained is preserved 5 in hermetically sealed boxes, preferably under partial vacuum.

After this preparation step 1 of the vegetal matter, the process according to the invention comprises an infusion step 6 of the latter. This infusion is performed in distilled water brought to the boil for an adapted period of time.

The infusion can be performed with 20 g of vegetal matter powder, obtained during the preparation step of the latter, infused in 100 ml of distilled water, brought to the boil for 15 minutes. In these proportions, the infusion is performed preferably in a closed 250 ml Erlenmeyer partially blocked during the infusion period, for example, by using a watch glass.

A subsequent filtration step 7 extracts from the filtrate obtained by the infusion an aqueous extract free of residue, in this case residue from the infused vegetal matter. This aqueous extract is supplemented if appropriate 8 with distilled water brought to the boil in order to replace the volume lost by removing the residue. This distilled water was previously advantageously used to rinse the vegetal matter residue before its incorporation in the aqueous extract. The volumes of aqueous extracts of 100 ml are for example kept away from light in hermetically closed bottles.

This filtration step 7 prevents the formation of vegetal matter deposits in the event the raw infusion is used.

Figure 2:
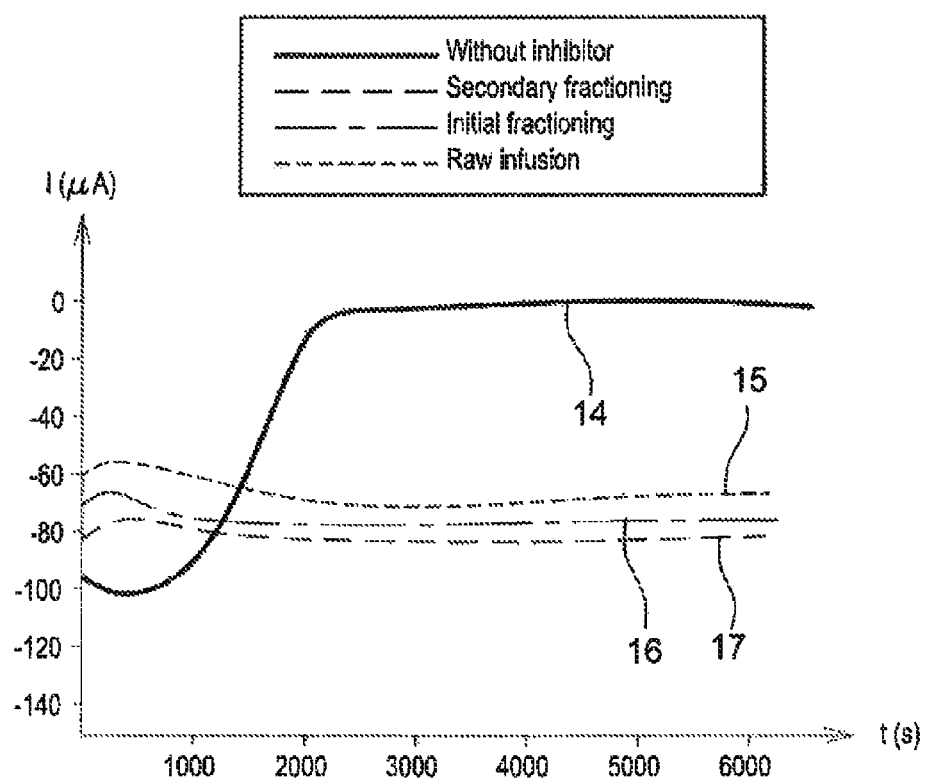
FIG. 2 represents a graphic comparing the variations in amperage between a steel surface with different solutions produced by the invention process on the one hand, and a solution that does not contain the invention product on the other hand.

The aqueous extract obtained by these steps already comprises in itself an anti-lime scale solution, as seen in the experimental results presented in FIG. 2. Thus, a preparation step 9 of anti-lime scale solution from an aqueous extract obtained after the filtration step 7 is easily achievable by adding 1 ml of aqueous extract for 99 mL of lime scaling water.

For further improvement, the process according to the invention comprises an initial polar fractioning step 10. This fractioning is performed preferably on a Sep-PAK C18 column according to the water/methanol polarity gradient using the aqueous extract obtained during the filtration step.

The initial fractioning step 10 consists of separating the most polar elements from the least polar elements of the aqueous extract. For this, the column C18 as well as the aqueous extract must be prepared.

Column C18 is balanced with an acid aqueous phase with the introduction of 5 ml of trifluoroacetic acid at 0.1% (also called TFA). This operation can be repeated a number of times to ensure a good balance in column C18, for example three times.

The infused aqueous extract is acidified before insertion in column C18 so as to obtain a 0.1% solution of TFA, for example for 3 ml of crude aqueous extract we would use 304 of TFA at 10%.

The acidified aqueous extract is then filtered on a filter to exclude all particles larger than 0.2 µm, for example with the use of a "Minisart" commercial filter.

This acidified and filtered aqueous extract is introduced in column C18 which retains the least polar elements of the extract. The most polar elements of the extract are not retained by the column. The eluate thus obtained corresponding to the elements not retained by column C18 and subsequently called fraction F, comprises the most polar elements of the aqueous extract. This eluate is directly usable for the preparation 9 of an anti-lime scale product according to the invention.

This initial fractioning step 10 is important because it enables, via a simple step, the insertion of only the crude extract in column C18, for example a reverse silica column C18, to obtain a solution excluding a large part of the compounds that do not have a lime scale inhibitor effect. In addition, this initial fractioning step is easily performed on a large scale with the use of large C18 columns.

In order to purify as much as possible the products obtained by the process according to the invention by limiting them to components with an inhibiting effect, the eluate obtained after the initial fractioning 10, comprised of the most polar elements of the aqueous extract, is used during a secondary fractioning step 12.

The extraction during this secondary fractioning 12 is based on the distribution of compounds between the liquid phase and the solid phase, with the eluate as a water/isopropanol mix. This secondary fractioning is performed preferably on a DPE Hypercarb carbon column, according to an isopropanol/water polarity gradient.

A selection step 13 is performed to retain only the least polar elements of the eluate obtained during the initial fractioning 10.

Typically, fractioning is performed first of all by introduction into the carbon column of the fraction F obtained following the initial fractioning 10, the fraction not retained by the carbon column during this secondary fractioning and subsequently called fraction C0 having been selected for the manufacture of the anti-lime scale product 9.

In a variant, following the insertion of the fraction F into the carbon column, an eluate comprised uniquely of isopropanol is introduced into this carbon column. The elements collected following the insertion of this eluate comprise a solution subsequently called fraction C100 that can also be selected for inclusion in the anti-lime scale product. This fraction C100 is a variant of the anti-lime scale solution according to the invention.

An improvement to the process according to the invention leading to more advanced purification of the solution obtained by the process according to the invention foresees the lyophilisation of fraction C0 or fraction C100 before a decanting step 11. The dry residues of the lyophilised fractions C0 and C100 are dissolved in 1 ml of methanol. A centrifugation process, for example in the order of 8 kg for 2 min, is used to obtain decanting with two phases: a supernatant and a pellet. The supernatant methanolic phase of this decanting is retained to comprise an ecological and purified anti-lime scale product.

The successive steps of the process according to the invention are used to obtain a product in solution form comprised of saponosides, monosaccharides, holosides and flavonoids. In the event of decanting using fraction C100, catechols are also included. According to the process step from which the solution is selected for insertion in the product, other components are present in this solution, the latter nonetheless retaining a lime scale inhibitor effect.

An improvement to the process according to the invention leads to a more advanced purification of fraction F as it optimises the concentration of the inhibiting solution.

This purification step of fraction F from this filtration provides notably for the flow of this fraction into a mini preparatory chromatography column of type "Sep pak diol" with an acetonitrile/water gradient. The composition of the retained gradient is 60% acetonitrile and 40% water. The eluate obtained is called fraction F60.

Subsequently, fraction F60 is analysed in more detail using an HPLC chromatrography on a Diol column of greater capacity used to separate and fraction F60 according to time. Fractioning of F60 is carried out over 15 minutes at a temperature of 40° C. The fractioning is performed using a linear gradient:

using a solution containing 100% of a solvent B (acetonitrile compound (90%) and water (10%)) and 0% of solvent A (acetonitrile compound (10%) and water (90%));

to reach, after fractioning, a solution containing 0% of solvent B and 100% of solvent A.

The collection of compounds whose migration time is between 10 min and 11.6 min presents an anti-lime scaling activity. This fraction is called F60_2.

Subsequently, an HPLC chromatography performed on fraction F60_2, in a Diol column, identical to the previous, is thus used to separate and to fraction F60_2 according to time. During this fractioning, the solvents are the same as those used previously. However, the linear gradient is this time programmed starting at 100% of B and 0% of A up to 30% of B and 70% of A, for 13 minutes at a temperature of 40° C. The collection of compounds whose migration time is between 10 min and 11 min presents an anti-lime scaling activity. This fraction is called F60_2_1.

Finally, fraction F60_2_1 is analysed in more detail via HPLC chromatography equipped this time with a high-resolution "Kinetex C18" column and which is used to separate and fraction F60_2_1 according to time. During this fractioning, the solvents used are acetonitrile and water.

The gradient is linear and programmed as follows: 100% water and 0% acetonitrile up to 100% acetonitrile and 0% water, for 6 minutes at a temperature of 40° C. The retrieval of compounds whose migration time is between 3.5 min and 4.5 min presents an anti-lime scaling activity. This fraction is called T.

Fractions F60, F60_2, F60_2_1 and T have the advantage of being cleared of compounds that are not part of the inhibiting formula. In addition, they have a concentration of around $1.08 \times 10^{-4}$ mg·L$^{-1}$. In prior art, the concentration for traditional use of an inhibitor is between 1 and 10 mg·L$^{-1}$.

The purification of fraction F into fraction T increases the efficiency of the inhibitor at very low concentrations for maximum efficiency, then 100% of the lime scale is eliminated.

In addition, these fractions are seen to be more efficient notably during temperature tests where lime scaling problems are more exacerbated. For example, for a lime scaling test performed at 20° C., fraction F60 provides optimal efficiency at a concentration of $1.08 \times 10^4$ mg·L$^{-1}$ and at a concentration of $1.3 \times 10^{-4}$ mg·L$^{-1}$ for a temperature of 45° C.

Moreover, one of the advantages of these fractions is that they are all hydrophiles and do not need additives to help with solubility, thus enabling the achievement of an anti-lime scale solution with a concentration in the order of $10^{-4}$ mg·L$^{-1}$ ($10^{-4}$ ppm), and with an efficiency of 100%, for use at temperatures between 20 and 45° C.

In addition, the solutions, irrespective of the step at which they are selected, comprise an anti-lime scale product in liquid or solid form after a lyophilisation stage. This product can be associated with an anti-corrosion product to fight the two phenomena at once: lime scale deposit and corrosion.

FIG. 2 represents a graphic comparing the variations in amperage between a steel surface with different solutions ((15, 16, 17) produced by the invention process on the one hand, and a solution that does not contain the invention product on the other hand. (14).

To reveal the inhibiting effect of the product obtained, different electro-chemical anti-lime scaling tests have been performed.

Firstly, a test in natural untreated lime scaling water was performed as a control (14).

Secondly, tests were performed with processes using products that can be obtained in the different steps of the process according to the invention.

These tests are chrono-amperometry tests, electrode scaling over time leading to a coating of the electrode and a reduced or even nil amperage.

Tests were performed using scaling water at 45° F. (French degrees: water hardness rating), at a surface rotation speed of 500 revolutions per minute, with an imposed potential of E=−1 V/ECS, with an electrode with a stainless steel nozzle 5 mm in diameter in 100 ml of solution. The tests were performed over 600 minutes.

The control curve with a solid line 14, corresponding to the lime scaling time in natural water only (without anti-lime scale additives), shows a complete and homogeneous scaling of the central disk of the electrode.

The curve with a dotted line 15, representing the lime scaling time for a solution comprising 99 ml of natural water and 1 ml of aqueous extract obtained directly by the infusion step, shows a partial and uneven coating of the centre of the electrode. The aqueous extract thus added to a lime scaling solution therefore inhibits the lime scaling of the electrode.

The curve with a dashed line alternating with dots 16, representing the lime scaling time for a solution comprised of 99 ml natural water and 1 ml of eluate obtained after the initial fractioning, shows an absence of coating of the centre of the electrode. Lime scaling with such a solution is therefore inhibited.

As seen by the curve with a dashed line 17 representative of a solution comprising 99 ml of natural water and 1 ml of eluate obtained by the secondary fractioning, this secondary fractioning obtains a solution ensuring a higher amperage and further inhibits lime scaling.

Obtaining these different solutions using the steps of the process according to the invention leads, via incorporation of the product obtained via the process in the water designed to circulate in the facilities or devices at risk of lime scale, to flow of water that does not give rise to undesirable lime scale, and this in a simple and quick way. This can be achieved on a large scale and above all ecologically as the anti-lime scale product is obtained from plants.

The invention claimed is:

1. A process for the manufacture of an anti-lime scale product, with the following steps:
   a preparation step of vegetal matter including saponosides, flavonoids, monosaccharides and holosides,
   an infusion step of this vegetal matter,
   a filtration step for this infusion,
   a preparation step of the anti-lime scale solution using a filtrate obtained during the filtration step wherein the infusion step is performed using boiled water and that the vegetal matter come from plants from one of or a combination thereof the following families: Caryophyllaceae, Asteraceae, Illecebraceae or Urticaceae; and
   wherein the process comprises a secondary fractioning step using a polar fraction obtained during an initial fractioning step.

2. The process according to claim 1, wherein the vegetal matter is comprised of catechols.

3. The process according to claim 1, wherein the separation of compounds carried out in the secondary fractioning step, takes place according the polarity gradient.

4. The process according to claim 1, wherein it comprises a selection step of intermediate polarity elements from the secondary fractionary step.

5. The process according to claim 1, wherein the initial fractioning step is performed in a C18 reverse silica fractioning column.

6. The process according to claim 1, wherein the secondary fractioning step is performed on a column filled with active carbons or a commercial carbon mini-column.

7. The process according to claim 1 wherein it comprises a decanting stem of the fractions obtained by the secondary fractioning and a process for the selection step of the supernatent obtained during this decanting.

8. The anti-lime scale product obtained by the manufacturing process according to claim 1.

9. The product according to claim 8, wherein its major component has a mass/charge ratio m/z=157.1 and a molecular formula $C_7H_{13}N_2$.

10. The product according to claim 9 wherein comprises minor components of the molecular formulae, $C_9H_{17}O_2$, $C_8H_{13}O_3$, $C_{10}H_{21}O$ and $C_{10}H_9N_2$.

11. The use of the product according to claim 9 for addition to water circulating in a device or facility.

12. The product according to claim 11, associated with an anti-corrosion film former such as ethanolamine or triethanolamine.

* * * * *